US006233215B1

(12) United States Patent
Paul et al.

(10) Patent No.: US 6,233,215 B1
(45) Date of Patent: May 15, 2001

(54) DOOR ASSEMBLY FOR A CARTRIDGE HANDLING DEVICE

(75) Inventors: D. Scott Paul, Fort Collins; Mark Ayars Smith, Greeley, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/491,538

(22) Filed: Jun. 16, 1995

(51) Int. Cl.[7] .......................... G11B 33/02; G11B 5/012
(52) U.S. Cl. ........................ 369/75.1; 360/97.01
(58) Field of Search .................. 369/77.2, 75.1, 369/75.2, 77.1, 7; 360/99.06, 97.01, 99.07

(56) References Cited

U.S. PATENT DOCUMENTS

| | | | |
|---|---|---|---|
| 4,817,079 | * 3/1989 | Covington | 369/77.2 |
| 5,146,070 | * 9/1992 | Toma | 235/475 |
| 5,179,504 | * 1/1993 | Kitahara | 361/684 |
| 5,297,122 | 3/1994 | Christie | 369/13 |
| 5,371,642 | * 12/1994 | Bryer | 360/96.5 |
| 5,408,459 | * 4/1995 | Kawaguchi et al. | 360/99.06 |
| 5,768,241 | * 6/1998 | Kanazawa et al. | 369/77.2 |

* cited by examiner

Primary Examiner—David Davis

(57) ABSTRACT

A door apparatus for a cartridge handling device, such as an optical disk cartridge insertion apparatus, is provided. The door apparatus includes a door which automatically retracts and lifts to open when the handling device is ready to receive or discharge a cartridge and which automatically lowers and extends to close when the handling device is busy and a user cannot insert a cartridge. The door is actuated by movement of the handling device and includes a self-aligning feature which allows the door to float with respect to the panel access opening. The door actuating mechanism is constructed to operate substantially in the same plane as the existing handling device, thus minimizing the overall size of the handling device and door apparatus combination.

19 Claims, 16 Drawing Sheets

DOOR ASSEMBLY FOR A CARTRIDGE HANDLING DEVICE

FIELD OF THE INVENTION

The present invention relates generally to a cartridge handling device, such as an optical disk cartridge handling device and, more particularly, to a door assembly for use with a cartridge handling device.

BACKGROUND OF THE INVENTION

An optical disk is a data storage medium which is readable by a laser-based reading device. Optical disks known as "compact disks" or "CDs" have become increasingly popular during the past few years for recording music and audio-video works. Due to the huge storage capacity of optical disks as compared to conventional magnetic storage media, optical disks known as "ROM disks" have become popular for storing computer readable information. However, until very recently, optical disks were of somewhat limited use in the computer industry due to the fact that optical disks could not be "erased" and "written" with new information, i.e. ROM disks are "read only" memory devices. However, recently, magneto-optic disks and other types of optical disks have been developed which are both computer readable and computer writable. Thus, in the future, optical disks are expected to become increasingly more important in the computer industry and may eventually replace magnetically readable and writable storage media such as "floppy disks" and "hard disks." Another recent development, the ability to provide data storage on both surfaces of an optical disk, has effectively doubled the optical disk storage capacity.

Optical disks of the type used in computer applications are mounted in a generally parallelepiped-shaped cartridge. Such a cartridge has a forward end which is generally provided with a ribbed surface portion which is adapted to be grasped between the thumb and index finger of an operator for handling the cartridge. The cartridge is adapted to be readably mounted in a conventional optical disk drive by grasping its forward end and inserting the cartridge, rear-end-first, through a narrow slot provided on the front face of a disk drive.

Currently, most optical disks are hand-inserted into disk drives. However, for large databases consisting of many optical disks, it is preferable, and perhaps essential, to provide an optical disk storage system for storing the disks at known locations, and an optical disk handling system which is capable of retrieving a desired disk from a storage location and inserting the disk in an optical disk drive. In a disk storage system wherein stored disks and an associated disk drive are positioned in longitudinally extending storage locations arranged in a two-dimensional array consisting of vertically extending columns and horizontally extending rows, it will generally be necessary for a disk handling system to engage and move each disk longitudinally, vertically, laterally, and, again, longitudinally in order to remove it from storage, move it into aligned relationship with a disk drive, and insert it into a disk drive. It may also be necessary for the disk handling system to flip the disk to reverse the side thereof which will be positioned in readable relationship with a drive.

Optical disk handling systems and components thereof which are adapted to insert and remove the optical disk cartridges from various storage locations of an optical disk storage system are described in U.S. Pat. No. 4,998,232 issued Mar. 5, 1991 of Methlie, Oliver, Stavely, and Wanger; U.S. Pat. No. 5,062,093 issued Oct. 29, 1991 of Christie, Wanger, Dauner, Jones and Domal; U.S. patent application Ser. No. 08/491,286 of Schmidtke, Coffin, Paul, and Christie for MEDIA CARTRIDGE INSERTION APPARATUS FOR A MEDIA CARTRIDGE STORAGE AND HANDLING SYSTEM, filed on the same day as this application; and in U.S. patent application Ser. No. 08/491,440 of Schmidtke, Coffin, and Christie for TENSIONING DEVICE FOR A FLEXIBLE DRIVE MEMBER, filed on the same day as this application, which are hereby specifically incorporated by reference for all that is disclosed therein. Optical disk handling systems are generally referred to in the industry as "autochangers" or "optical disk juke boxes".

It is desirable that an optical disk handling system be provided with a door for closing the operator access opening. Such a door may provide visual feedback to the operator indicating when a disk may be inserted. When the door is open, the handling system is ready to receive a cartridge. When the door is closed, the system is busy and, thus not ready to receive a cartridge from the operator. The use of a door also prevents contaminants from entering the handling system and the optical disk storage system.

The addition of a door to a cartridge handling system has, however, presented problems. If a door is to be automatic (i.e., capable of indicating when the handling system is ready to receive a cartridge), then it must be powered. In the past, this has necessitated a separate motor or other type of actuator to power the door. The addition of such a separate actuator adds cost and complexity to the handling system.

Door opening mechanisms also tend to occupy considerable space, thus requiring an undesirable expansion of the overall storage system size envelope. Finally, it is often difficult to accurately register the handling apparatus to both the internal mechanisms of the storage apparatus and to a door opening located on the outer surface of the storage apparatus.

It is also desirable that such a door present an aesthetically pleasing appearance from the outside of the storage system.

Thus, it would be generally desirable to provide an apparatus which overcomes these problems associated with cartridge door designs. Similar problems may be encountered with other types of media cartridge handling devices, for example handling devices used with floppy disks, removable hard disks and tapes.

SUMMARY OF THE INVENTION

The present invention is directed to a door apparatus for a cartridge handling device, such as an optical disk cartridge insertion apparatus which is adapted to be used in an optical disk storage and handling system.

The door apparatus includes a door which automatically opens when the handling device is ready to receive or discharge a cartridge and which automatically closes when the handling device is busy and a user cannot insert a cartridge.

The door is actuated by movement of the handling device itself. Accordingly, no additional power supply is required to operate the door. Additionally, the door actuating mechanism is constructed to operate substantially in the same plane as the existing handling device, thus minimizing the overall size of the handling device and door apparatus combination.

The door apparatus also includes a self-aligning feature which allows the door to float with respect to the panel access opening. This reduces the need to maintain close alignment between the outer panel and the handling device.

An aesthetically pleasing appearance, as well as a closely sealed door opening, is achieved by having the door panel fit within the door opening when the door is in the closed position. To accomplish this, the door actuator mechanism operates to both retract and lift the door when opening the door.

DETAILED DESCRIPTION OF THE PREFERRED EMBODIMENT OF THE INVENTION

In General

Figure 1:
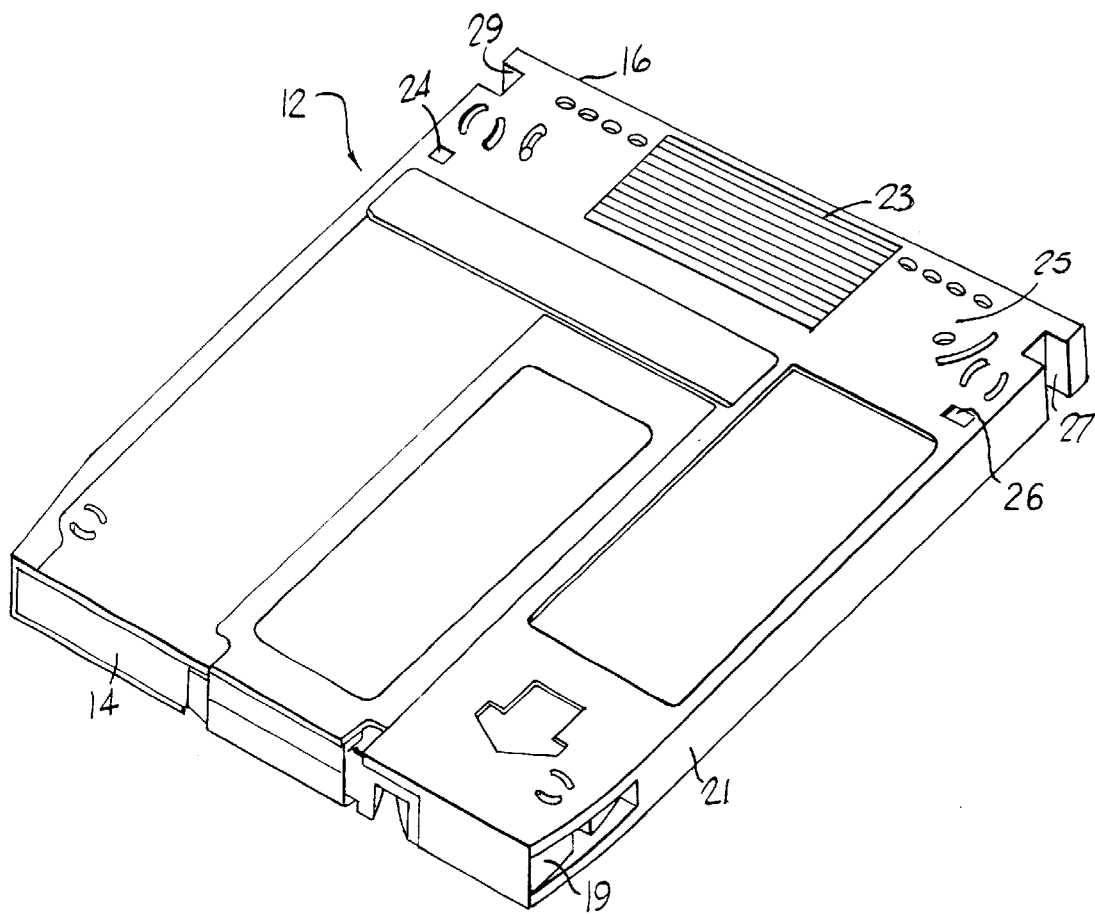
FIG. 1 is a perspective view of a conventional optical disk cartridge.

FIGS. 12–21 illustrate a door assembly 410 for a cartridge receiving device 10 having an exteriorly located panel 412 which includes an access opening 422 therein adapted to receive cartridges 12 therethrough. The door assembly 410 includes a door opening mechanism 426 operatively associated with the cartridge receiving device 10. A door panel 424 is provided which is adapted to close the access opening 422. The door panel 424 is slidingly attached to the door opening mechanism 426.

Also illustrated is a method of opening the access door 424 of a cartridge receiving device 10 of the type having an exteriorly located panel 412 which includes an access opening 422 therein adapted to receive cartridges 12 therethrough. The method includes the steps of retracting the door 424 away from the access opening 422 and lifting the door 424.

Having thus described the insertion apparatus 10 in general, various features of the apparatus will now be described in further detail.

Optical Disk Cartridge

A conventional optical disk cartridge 12 is illustrated in FIG. 1. The optical disk cartridge has a rear end portion 14 which is adapted to be inserted into an optical disk reading device and a forward end portion 16 which is adapted to be grasped by a human operator for handling the cartridge. Conventional optical disk cartridges in use in the United States for computer applications have a generally parallelepiped shape with a thickness (height) of approximately 0.4 inches, a length of approximately 6 inches, and a maximum width of approximately 5.3 inches. The rear end portion 14 of an optical disk cartridge tapers in width somewhat in approximately the last 0.5 inch of axial length thereof from a maximum lateral dimension of 5.3 inches to a minimum lateral dimension of approximately 5.1 inches at the terminal end thereof. Each optical disk has symmetrically positioned recesses 19 (only one shown) in the lateral sidewalls 21 (only one shown) thereof which are adapted for engaging a portion of a reading device. The forward end of a conventional optical disk cartridge has a centrally positioned ribbed surface 23 (only one shown) on both a top 25 and bottom surface (not shown) thereof. Each optical disk also comprises a first rectangular groove 27 and a second rectangular groove 29 in a forward portion of the lateral sidewalls which are adapted to be engaged by portions of conventional reading devices for locating and holding the cartridge in the reading device. An optical disk may also include holes 24 and 26 which may be used for proper orientation detection.

Housing

Figure 2:
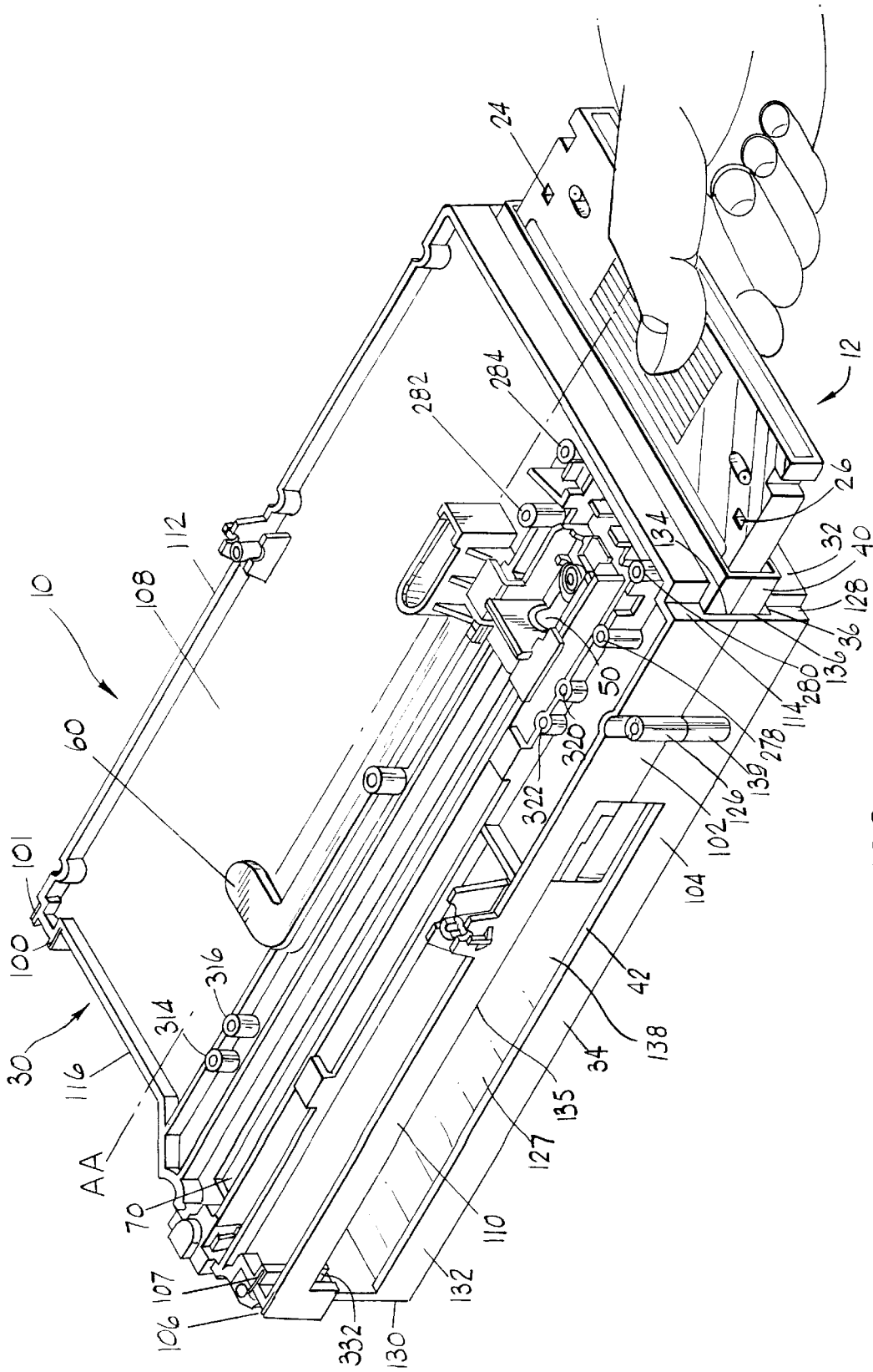
FIG. 2 is front perspective view of an optical disk insertion apparatus.

Referring to FIG. 2, housing 30 may comprise an upper housing member 102 and a lower housing member 104. The upper housing member 102 has a top panel portion 108, first and second lateral sidewalls 110, 112, a front wall 114, and a rear wall 116.

The front wall 114 includes a laterally extending opening 134 therein which may have a lateral dimension of, e.g. 145.4 mm and a height of, e.g. 10 mm. The side wall 110 includes an opening 135 therein, which may be, e.g., 184.39 mm wide and, e.g. 10 mm high.

The peripheral walls 110, 112, 114, 116 of the upper housing member 102 may include vertically extending bores 126 which are adapted to receive screws for attaching the upper housing member 102 to the lower housing member 104. The upper housing member 102 also contains the track 60 and the actuator guide 70.

The lower housing member 104, as best illustrated in FIG. 2, comprises a bottom panel 127, a front wall 128, a rear wall 130, a first lateral sidewall 132 and a second lateral sidewall, not shown. The front wall 128 includes a laterally extending opening 136 therein which may have a lateral dimension of, e.g. 145.4 mm and a height of, e.g. 11.8 mm. The side wall 132 has an opening 138 therein, which may be, e.g., 184.39 mm wide and, e.g. 11.8 mm high.

The peripheral walls 128, 130, 132 of the lower housing member 104 may comprise bores 139 therein adapted to threadingly accept screws or the like for attaching the upper housing member 102 to the lower housing member 104. The upper and lower housing members, when attached, define a generally parallelepiped-shaped cavity which may have a lateral dimension of, e.g., 145.4 mm, a longitudinal dimension of, e.g., 257.2 mm, and a height of, e.g., 21.8 mm.

The front opening 134 in upper housing member 102 and the front opening 136 of lower housing member 104 cooperate to form the front opening 36 in the housing 30 when the upper housing member 102 and the lower housing member 104 are assembled. Similarly, the side opening 135 in upper housing member 102 and the side opening 138 of lower housing member 104 cooperate to form the side opening 42 in the housing 30 when the upper housing member 102 and the lower housing member 104 are assembled. When upper housing member 102 and lower housing member 104 are assembled, the front opening 36 may have a lateral dimension of, e.g., 145.4 mm and a height of, e.g., 21.8 mm. The side opening 42 may have a lateral dimension of, e.g., 184.39 mm and a height of, e.g., 21.8 mm.

As will be explained in more detail, all of the insertion device sliding members (track 60 and actuator guide 70) are located in the upper housing member 102. Accordingly, it is desirable to construct the upper housing member 102 from a durable, high-strength plastic, such as polycarbonate with 15% carbon and 15% PTFE, in order to resist wear induced by the sliding members. Since the lower housing member 104 contains no sliding members, it may be constructed of a less expensive plastic such as polycarbonate with a 20% fiberglass filler.

The housing 30 may also be provided with crush bumps 100, 101, 106, 107 located on upper housing member 102, FIG. 2. These crush bumps facilitate installation of the housing into the optical disk storage and handling system 11. When the housing 30 is inserted into a closely fitting handling system receptacle, the crush bumps 100, 101, 106, 107 are able to shear away to configure to the exact size of the receptacle. This greatly facilitates alignment between the housing 30 and its associated handling system 11. Similar crush bumps, not shown, may also be provided on the lower housing member 104.

Cartridge Carrier

Figure 5:
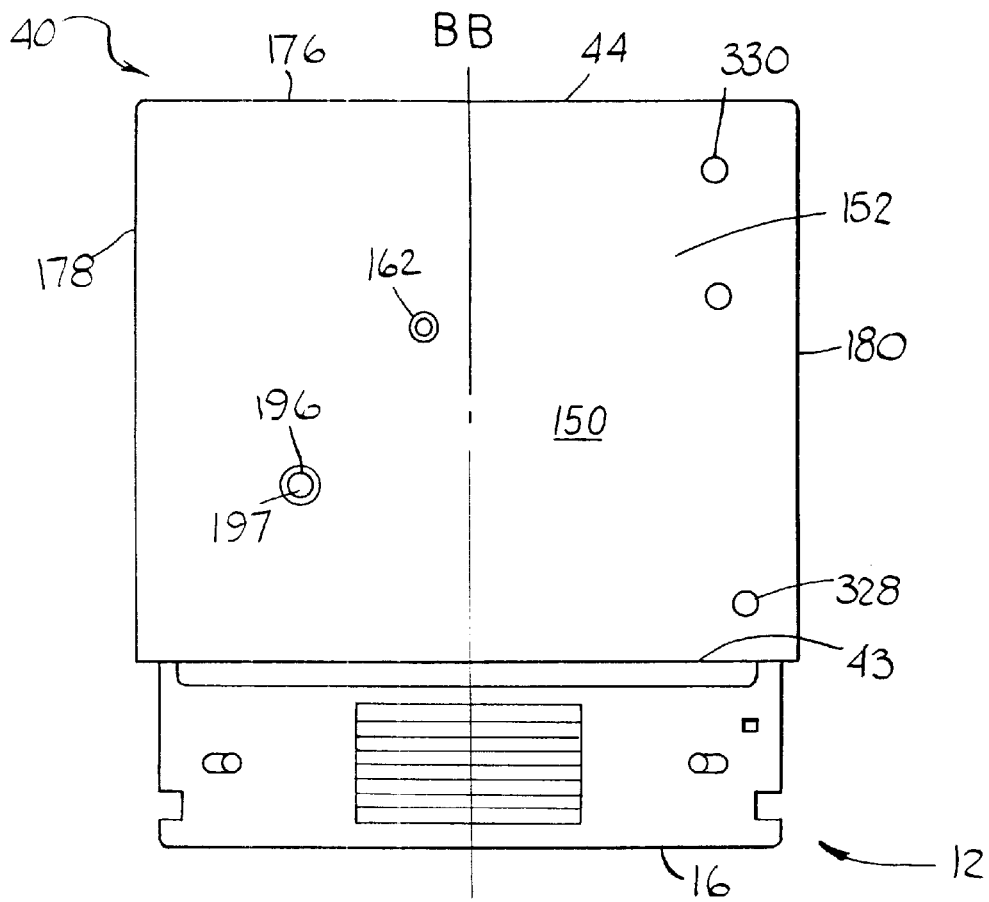
FIG. 5 is top plan view of an optical disk cartridge carrier with a disk inserted.
Figure 6:
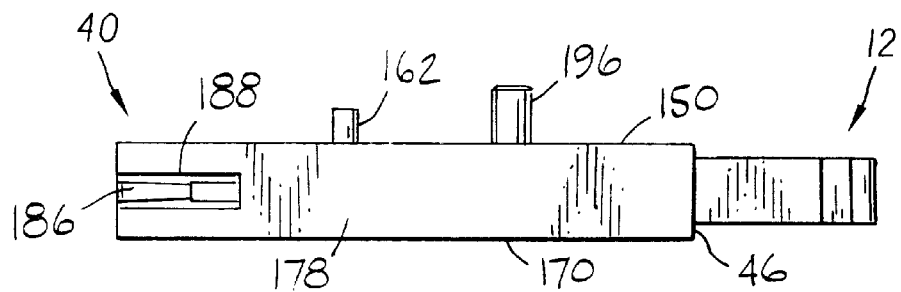
FIG. 6 is a side elevation view of the optical disk cartridge carrier of FIG. 5.

As illustrated in FIGS. 5 and 6, the cartridge carrier 40 comprises an upper member 150 and a lower member 170. Upstanding rear wall 176 and two upstanding lateral sidewalls 178, 180 connect the upper member 150 to the lower member 170. Cartridge carrier 40 may have a longitudinal length of, e.g., 118.04 mm and a lateral width of, e.g., 142.1 mm, as viewed in FIG. 5.

The upper member 150 of cartridge carrier 40 comprises a generally flat, horizontal panel 152. The upper member 150 also comprises an upstanding stud member 162 which is adapted to ride in track 60, as described in further detail below.

Stud 162 may have a diameter of, e.g., 5.8 mm and an axial length of, e.g., 5.1 mm. Stud 162 may be located at a longitudinal distance of about 74.19 mm rearwardly of the forward edge portion of member 152 and at a lateral distance of about 62.37 mm from the left side of member 152, as viewed in FIG. 5.

Upper member 150 also has a connection stud 196, FIG. 5, projecting from the top thereof. The projection stud 196 may have a diameter of, e.g., 7.0 mm and an axial length of, e.g., 9.0 mm and may be located on the upper member 152 at a longitudinal distance of 39.19 mm from the forward edge of the upper member and a lateral distance of 37.55 mm from the left side of upper member 152, as viewed in FIG. 5. Stud 196 contains a threaded opening 197 which allows attachment of the carrier 40 to the actuator 50.

Leaf springs 186 may be provided at the rear of carrier 40. The leaf spring 186 projects into a cutout portion 188 in sidewall 178 and has a laterally projecting portion thereon which is adapted to engage the rear sidewall recess 19, FIG. 1, of an optical disk 12 which is received in the carrier 40. A similar leaf spring, not shown, may also be provided in sidewall 180. The spacing between the two sidewalls 178, 180 may be, e.g., 135.4 mm and the spacing between the upper member 150 and the lower member 170 may be, e.g., 12 mm. This spacing allows a cartridge 12 to be received in closefitting, sliding relationship within the cartridge carrier 40.

Track

Figure 4:
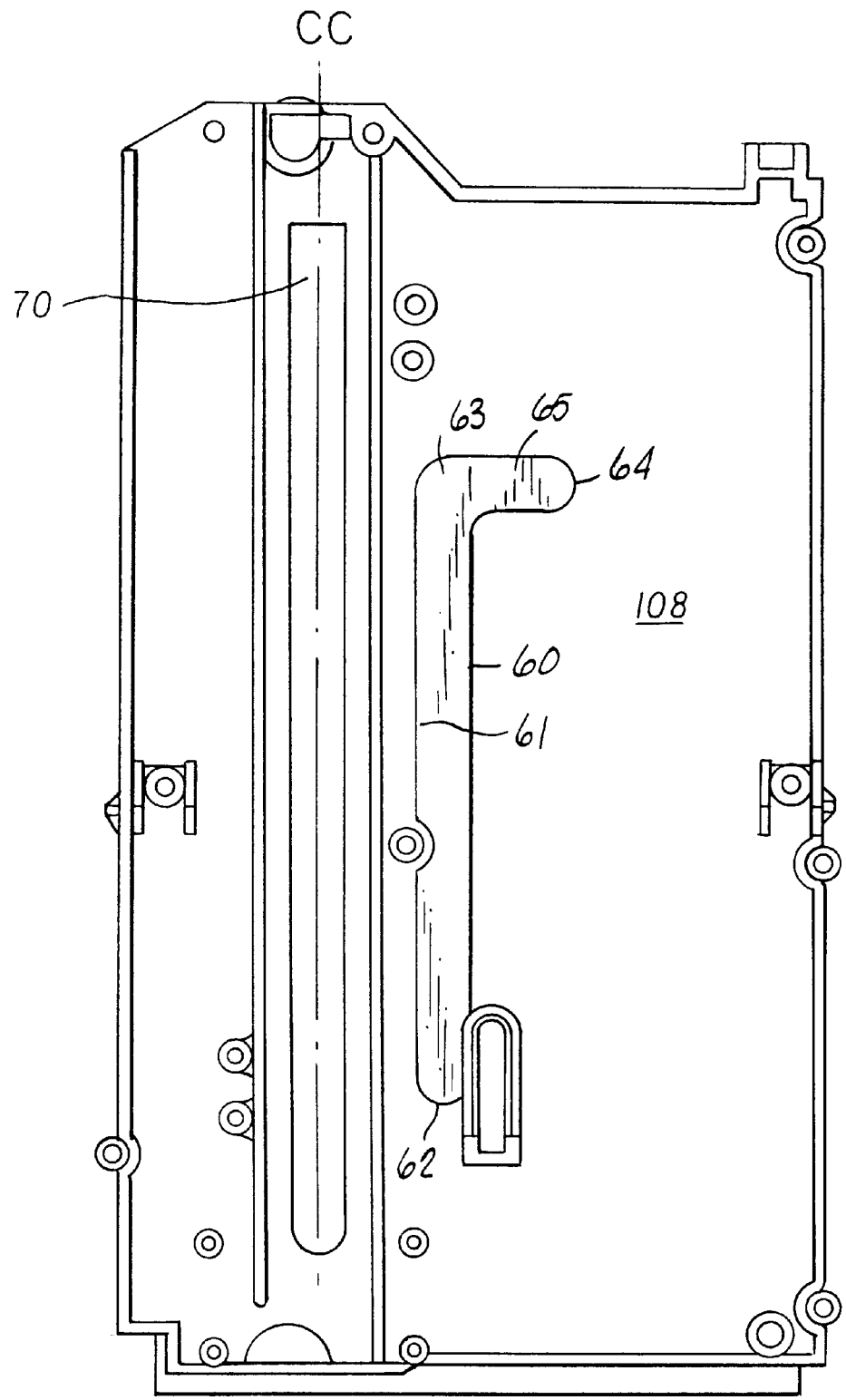
FIG. 4 is a top plan view of an upper housing member.

As best illustrated in FIG. 4, the upper housing member 102 top panel 108 has a generally longitudinally extending track 60. The track 60 has a constant width, e.g., 6.14 mm, and is adapted to receive the carrier stud 162 therein. The track 60 has a forward end 62 and a rear end 64. The forward end 62 is positioned approximately 58 mm rearwardly of the forwardmost edge of top panel 108 and approximately 67.55 mm from the left side of top panel 108, as viewed in FIG. 4. The rear end 64 is positioned approximately 196.76 mm rearwardly of the forwardmost edge of upper top panel 108 and approximately 94.79 mm from the left side of top panel 108, as viewed in FIG. 4. The track 60 comprises a first straight portion 61 which is positioned parallel to housing axis AA. The track 60 comprises an arcuate second portion 63 which has an inner radius of about 6 mm and an outer radius of about 9.13 mm. The track has a straight third portion 65 beginning at the end of the arcuate second portion 63 and ending at the track rear end 64. Track straight third portion 65 extends in substantially perpendicular fashion to track portion 61.

Actuator Guide

Figure 9:
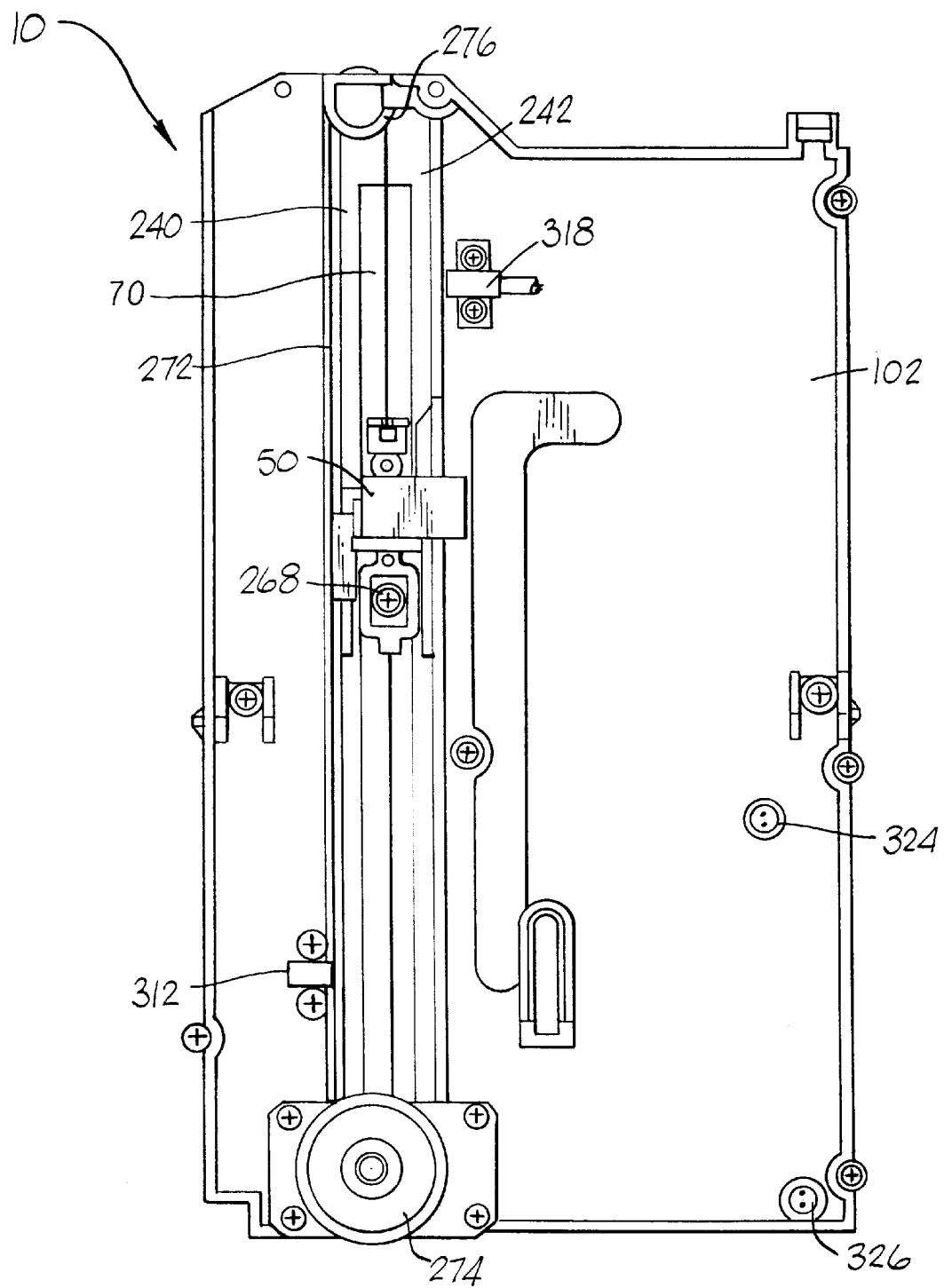
FIG. 9 is a top plan view of an optical disk insertion apparatus.

As best illustrated in FIGS. 2 and 9, actuator guide 70 may be integrally formed with the top surface of housing upper member 102. The actuator guide may comprise first and second L-shaped longitudinally extending members 240, 242, FIG. 9, which are adapted to longitudinally slidingly receive actuator 50 therewithin and guide it along a longitudinally extending path. The guide members 240, 242 may be integrally formed with the top housing member 102.

As previously described, both the track 60 and the actuator guide 70 are located on the housing upper member 102. Since no guidance structure is located on the housing lower member 104, alignment between the housing upper member 102 and the housing lower member 104 is not critical. This allows for much easier manufacturing of the insertion apparatus 10.

Actuator

As best illustrated in FIGS. 2 and 9–11, the actuator 50 may comprise a generally parallelepiped-shaped member having a body portion 250. The actuator has a bottom surface portion 254 and a plurality of generally vertically extending lateral side surfaces 256, 258, 260, 264. The actuator may also be provided with a rearwardly extending member 261 having an outer surface 262.

In operation, the bottom surface portion 254 of the actuator 50 is slidingly guided along the bottom portions of the L-shaped members 240, 242 of the track 60. The side surfaces 256 and 258 of the actuator 50 fit within the upright portions of the L-shaped members 240 and 242. In this manner, the actuator 50 is restricted from vertical and lateral movement and, thus, constrained to longitudinal movement along the track 60. The actuator 50 may have a lateral dimension of about 20 mm from side surface 256 to side surface 258. The track 60 may have a lateral dimension of about 20.4 mm between the upright portions of its L-shaped members 240 and 242.

A hole 266 is provided in the bottom surface 254 of the actuator 50. A bolt 268, FIG. 9, or other connection mechanism is passed through the hole 266 and engages with the threaded opening 197 of the cartridge carrier connector stud 196. In this manner, the actuator 50 may be connected to the cartridge carrier 40 and movement of the actuator 50 along the actuator guide 70 will cause movement of the cartridge carrier between the positions shown in FIGS. 7 and 8.

A projection 270 is provided on the bottom surface 254 of actuator 50 to ensure that adequate clearance is maintained between the bottom surface 254 of the actuator 50 and the top panel 152 of the cartridge carrier 40. This clearance allows the actuator-cartridge carrier assembly to freely slide along the lower portion of the L-shaped members 240 and 242. Hole 266 passes through the projection 270 and, when the actuator 50 is attached to the cartridge carrier 40 with the bolt 268, the stud 196 of the cartridge carrier fits into this hole and the projection 270 abuts the top panel 152 of the cartridge carrier. Projection 270, and thus the clearance described above, may extend for a distance of about 3 mm.

The actuator 50 also includes a front connector 271 and a rear connector 273. These connectors are used to attach the actuator 50 to opposite ends of a wire rope 272, FIG. 9. Wire rope 272 may be include a steel wire core member having a diameter of, e.g., 0.610 mm surrounded by a coating, such as a nylon coating. The diameter of the wire rope, including such a nylon coating may be, e.g., 0.760 mm. This coating may be provided in order to reduce slippage between the wire rope and the motor drive pulley as described below and to extend the life of various pulleys within the system. Wire rope 272 may have a length of about 557.8 mm and may be of a type commercially available from Sava Industries of No. 4 North Corporate Drive, P.O. Box 30, Riverdale, N.J.

Wire rope 272 is driven by a pulley, not shown, which is attached to motor 274, FIG. 9, in a conventional manner. Wire rope 272 also passes around an idler pulley 276 located at the rear of the insertion apparatus 10. Motor 274 may be attached by screws to the bores 278, 280, 282, 284 located in the top panel 108 of upper housing member 102, FIG. 2. Motor 274 may be an 18 volt DC motor and may include a reducing gear mechanism which may provide, e.g. a 19.53:1 reduction. As can be appreciated, operation of the motor 274 will cause movement of the wire rope 272 and, thus movement of the actuator 50 and the attached cartridge carrier 40.

Figure 10:
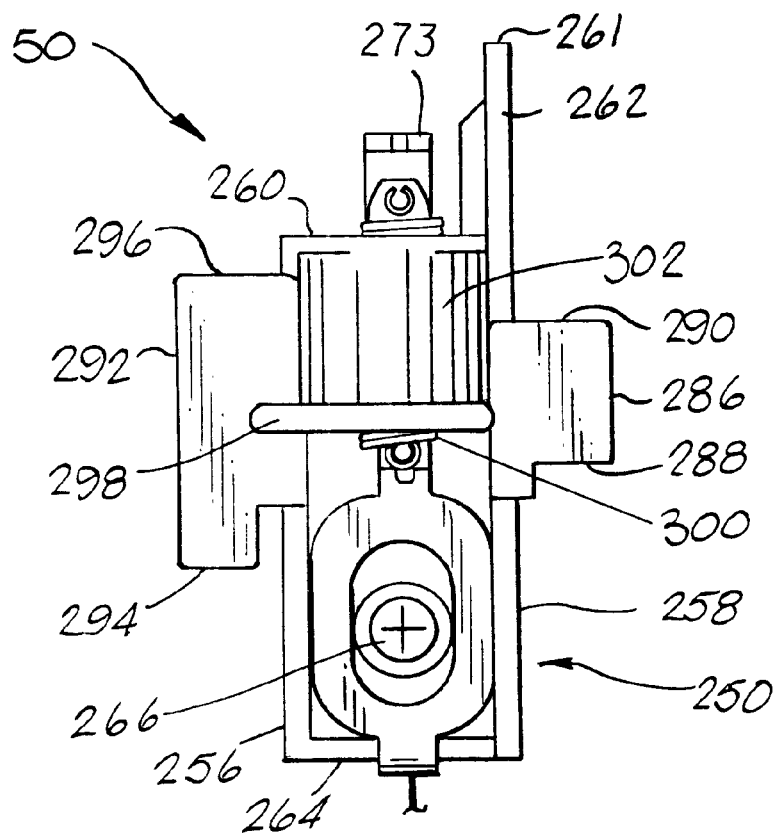
FIG. 10 is a top plan view of an actuator used in the optical disk insertion apparatus of FIG. 9.
Figure 11:
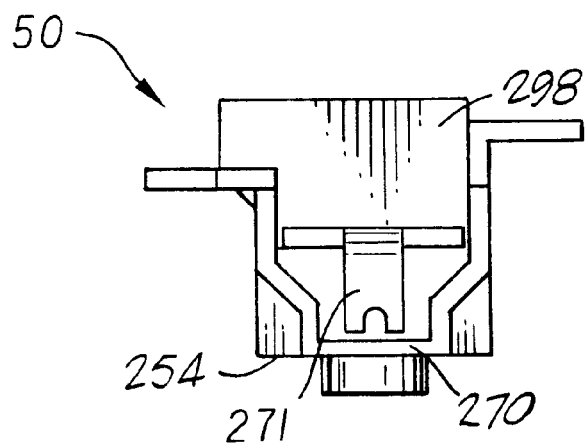
FIG. 11 is a front elevation view of the actuator of FIG. 10.

Referring to FIGS. 10 and 11, actuator 50 may also include first and second tabs 286 and 292 which may be used for actuator control. First tab 286 has a front edge 288 and a rear edge 290. In a similar fashion, second tab 292 has a front edge 294 and a rear edge 296. A transverse member 298 is provided between the tabs 286 and 292 and provides additional strength and rigidity to the tabs.

Actuator 50 may also include a spring 300 for maintaining the proper tension in the wire rope 272. A cylindrical portion 302 of the actuator 50 may be provided to house the spring 300.

As previously described, the cartridge carrier 40 is attached to the actuator 50 only by the connector stud 196, FIG. 5. Since the connector stud is not located at the center of gravity of the cartridge carrier, the side 180 of cartridge carrier 40 remote from the connector stud may tend to sag slightly. Although this is not a problem while the cartridge carrier is being shuttled back and forth, it may become a problem when the cartridge carrier is located in the user access position, FIGS. 2 and 7, or the handling device access position, FIGS. 3 and 8. To alleviate this problem, a ramp 332 may be provided at the side opening 42 of the housing 30. This ramp pushes down on the left side (as viewed in FIG. 2) of the cartridge carrier 40 as the cartridge carrier moves into the handling device access position. This downward force lifts the opposite sagging side and causes the cartridge carrier 40 to assume a properly aligned configuration. The ramp may have a height of about 1.1 mm.

A similar ramp, not shown, may also be provided at the left side of the forward opening 36 of the housing 30 to cause the cartridge carrier to assume a properly aligned configuration at the operator access end portion of the insertion apparatus 10.

Insertion Apparatus Operation

Figure 7:
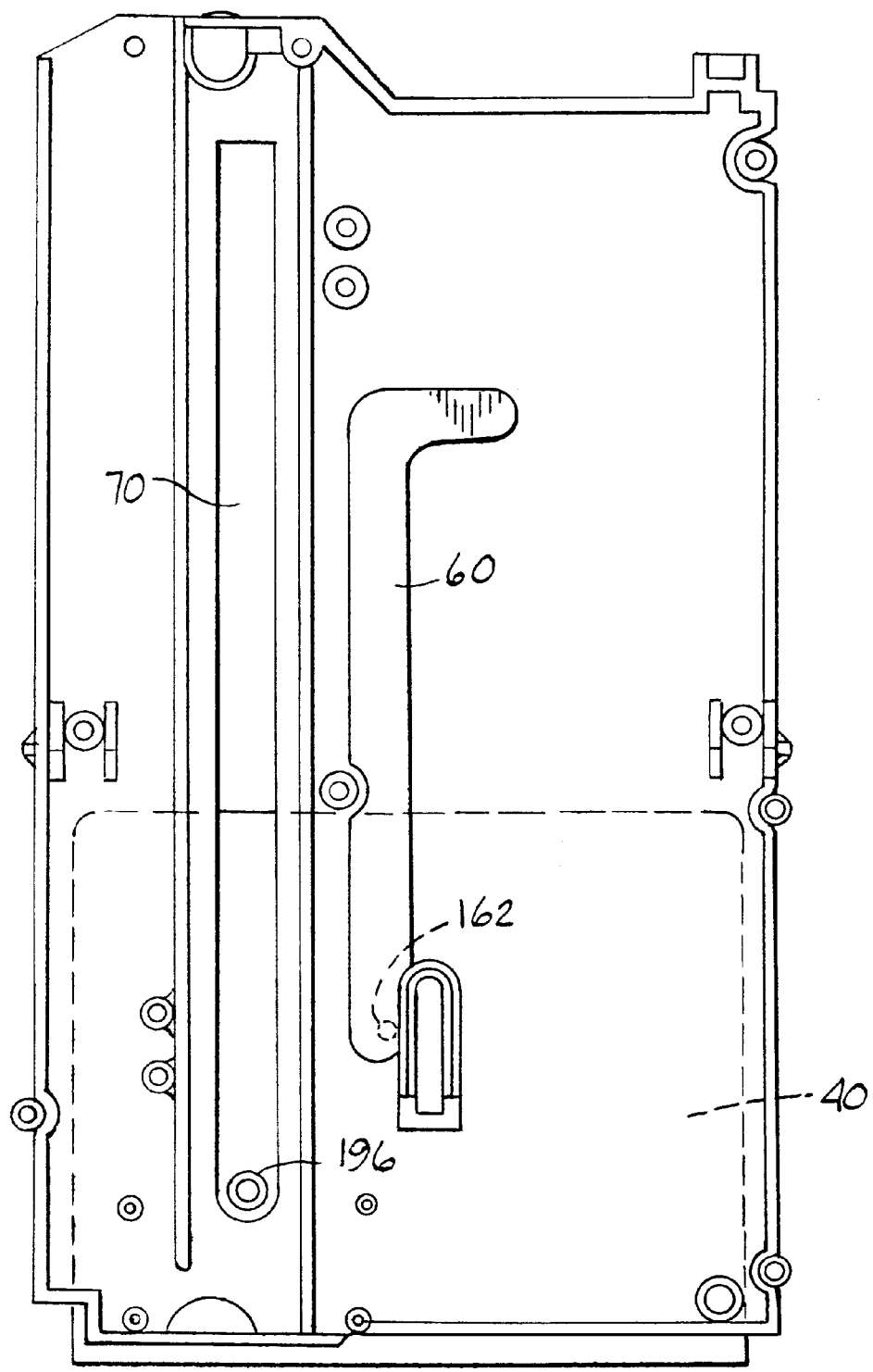
FIG. 7 is a top plan view of an upper housing member and an optical disk cartridge carrier located in a first operating position.
Figure 8:
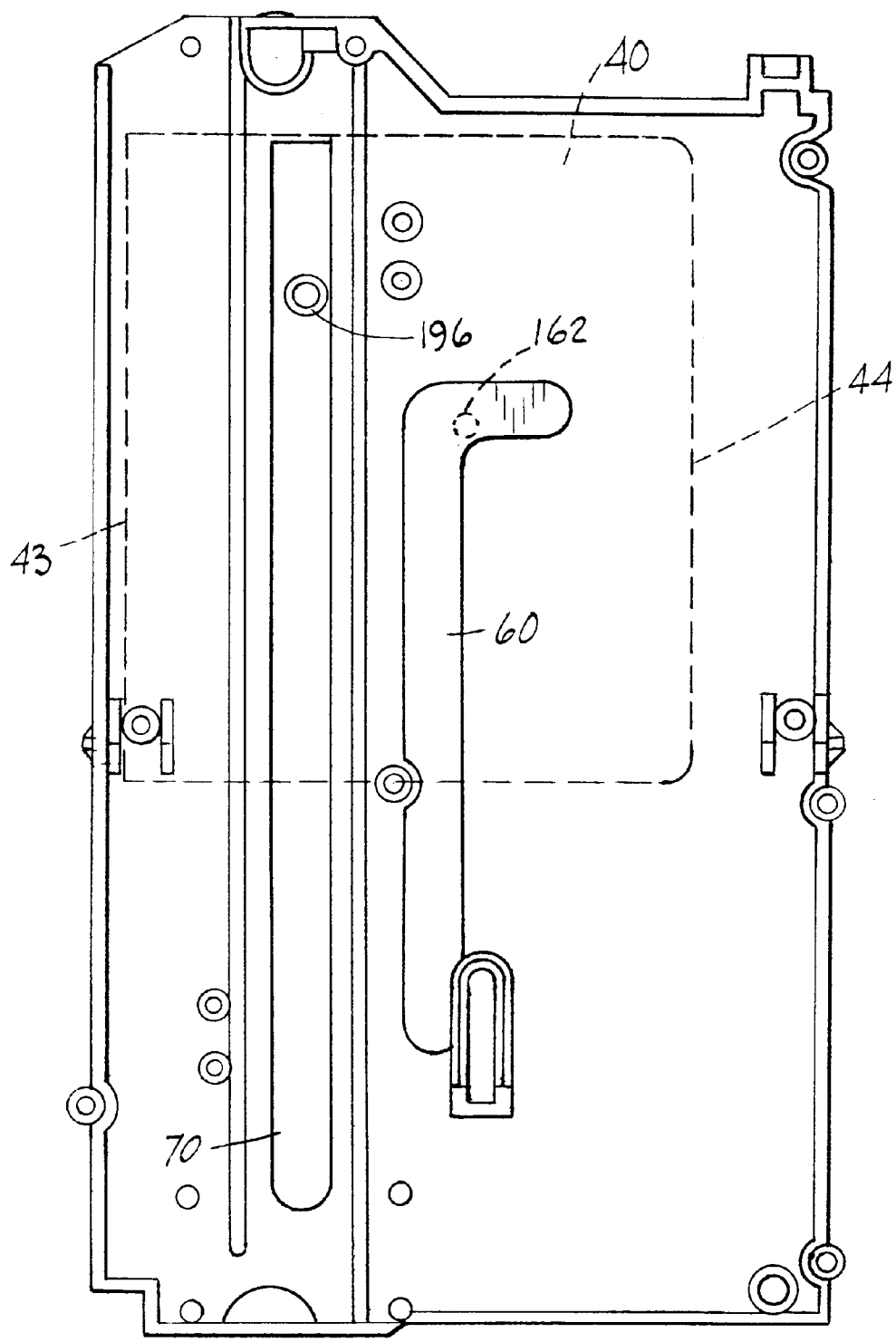
FIG. 8 is a top plan view of an upper housing member and an optical disk cartridge carrier located in a second operating position.

The optical disk cartridge receiving apparatus 10 has a first operating position, FIGS. 2 and 7, for receiving an optical disk from a human operator. In this first operating position, the cartridge carrier 40 is positioned with studs 162 and 196 thereof in the forwardmost positions within their respective guides 60, 70 in the housing 30, FIG. 7. In this position, the forward end portion 43 of the cartridge carrier is positioned approximately 7.75 mm in front of the housing front wall 114, 128 and the longitudinal axis BB of the carrier is positioned parallel to the longitudinal axis AA of the housing 30. When the cartridge inserted by the operator is fully inserted into the carrier 30, FIG. 2, a forward portion of the cartridge 12, e.g. 38.9 mm, projects outwardly from the front end 43 of the cartridge carrier 40.

Motor 274, FIG. 9, is then actuated in a counter-clockwise direction to begin moving the wire rope 272 and thus retracting the actuator 50 and the attached cartridge carrier 40 away from the forward end 32 of the housing. As actuator 50 moves rearwardly along the actuator guide 70, the cartridge carrier stud 162 will move rearwardly along the first portion 61 of the track 60, FIG. 4.

As the stud 162 enters the arcuate portion 63 of the track 60, the cartridge carrier 40 begins to rotate about the connector stud 196 in a clockwise direction. This clockwise rotation continues as the stud 162 enters and moves along the third portion 65 of the track 60 toward the end 64 of the track. As the actuator 50 further retracts and moves past the third portion 65 of the track 60, the stud 162 will reverse its direction, moving along the third portion 65 of the track 60 away from the end 64. When the stud 162 reaches the position shown in FIG. 8, the cartridge carrier 40 has been rotated a full 90 degrees.

Figure 3:
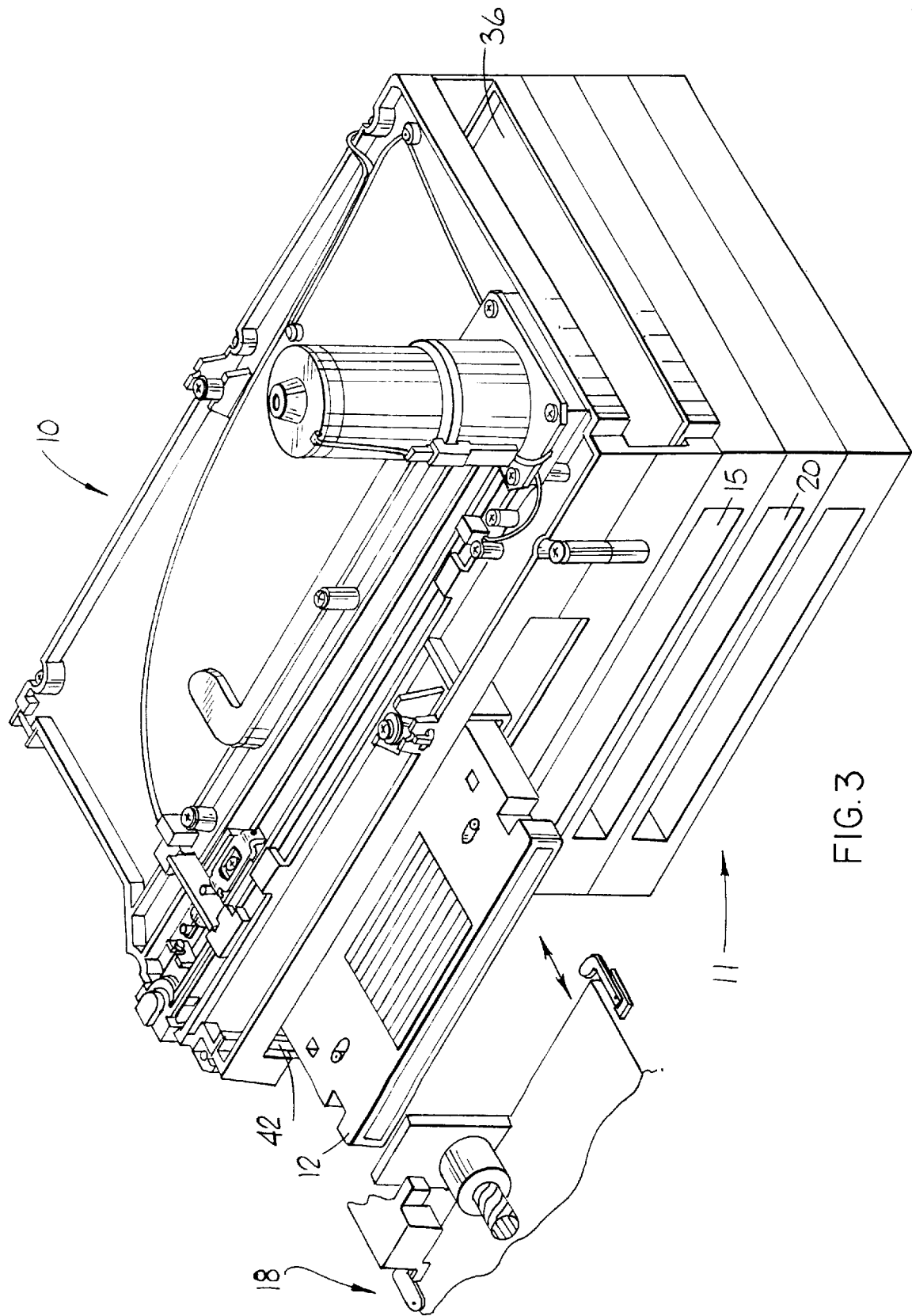
FIG. 3 is rear perspective view of an optical disk insertion apparatus and portions of an associated optical disk storage and handling system.

At this point, the cartridge carrier has been rotated 90 degrees and the cartridge may be removed by the handling device 18 as shown in FIG. 3. After removal, the process may be reversed as described below to return the cartridge carrier 40 to the user interfacing position shown in FIGS. 2 and 7. The carrier may be returned with a cartridge for removal from the system or it may be returned empty in order to load another cartridge.

To return the cartridge carrier 40 to the user interfacing first operation position shown in FIGS. 2 and 7, the motor 274 is actuated in a clockwise direction to begin moving the wire rope 272 and thus moving the actuator 50 and the attached cartridge carrier 40 toward the forward end 32 of the housing.

As actuator 50 moves forwardly along the actuator guide 70, the cartridge carrier stud 162 will first move into and then out of the track third portion 65 in a reverse manner from that previously described. As this happens, the cartridge carrier will begin to rotate in a counter-clockwise direction about the connector stud 196.

As the stud 162 enters the first portion 61 of the track 60, the rotation of the cartridge carrier has been completed and the cartridge carrier axis BB is once again parallel to the insertion apparatus axis AA.

Further clockwise rotation of the motor causes continued forward movement of the actuator 50 and carrier 40 toward the front of the housing 30 until the actuator once again reaches its fully forward position.

At this point, the cartridge carrier has been rotated 90 degrees to a configuration as shown in FIGS. 2 and 7 and a cartridge may be either removed or inserted by an operator.

Door Assembly

Figure 12:
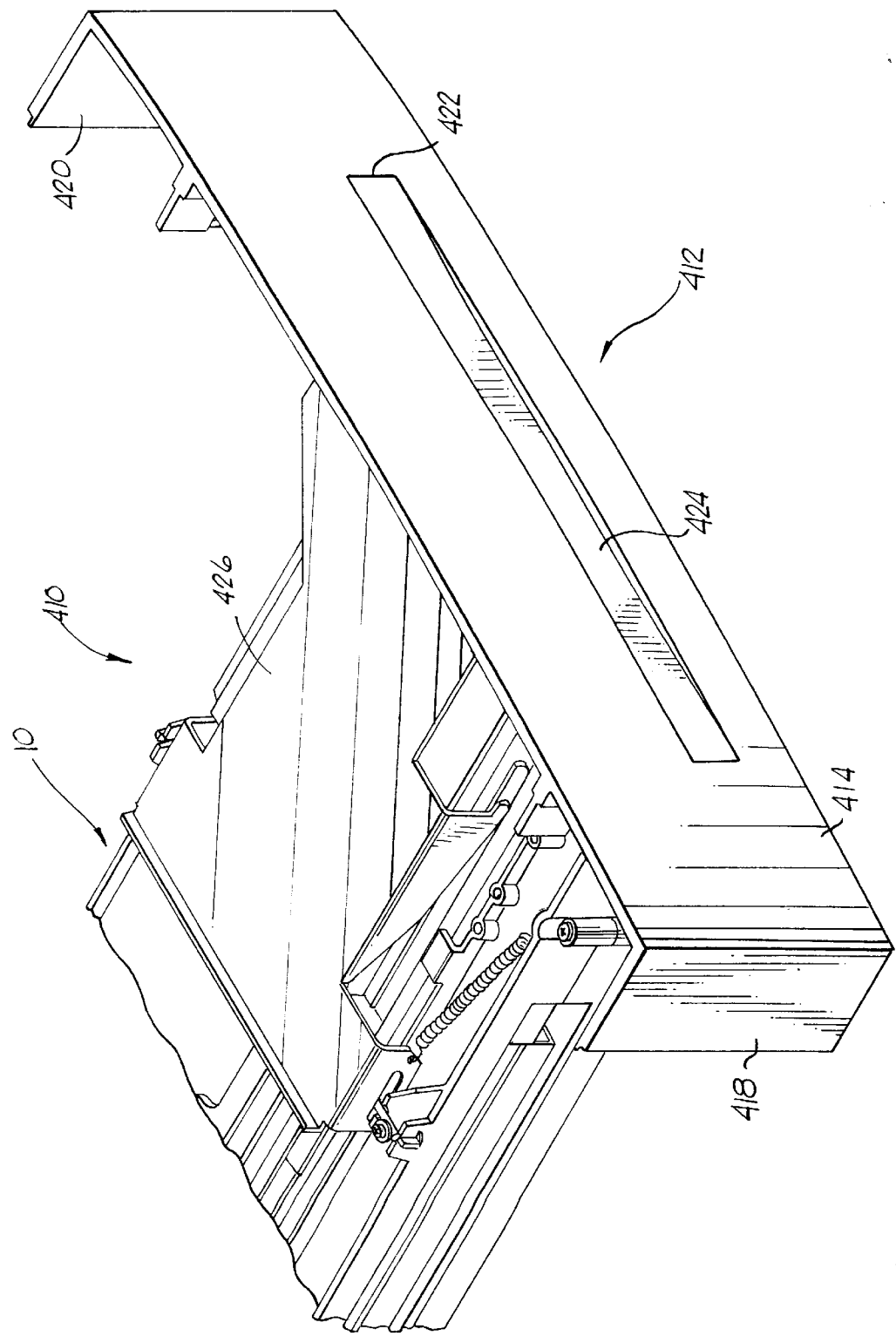
FIG. 12 is a front perspective view of an optical disk insertion apparatus having a door assembly in a closed position.
Figure 13:
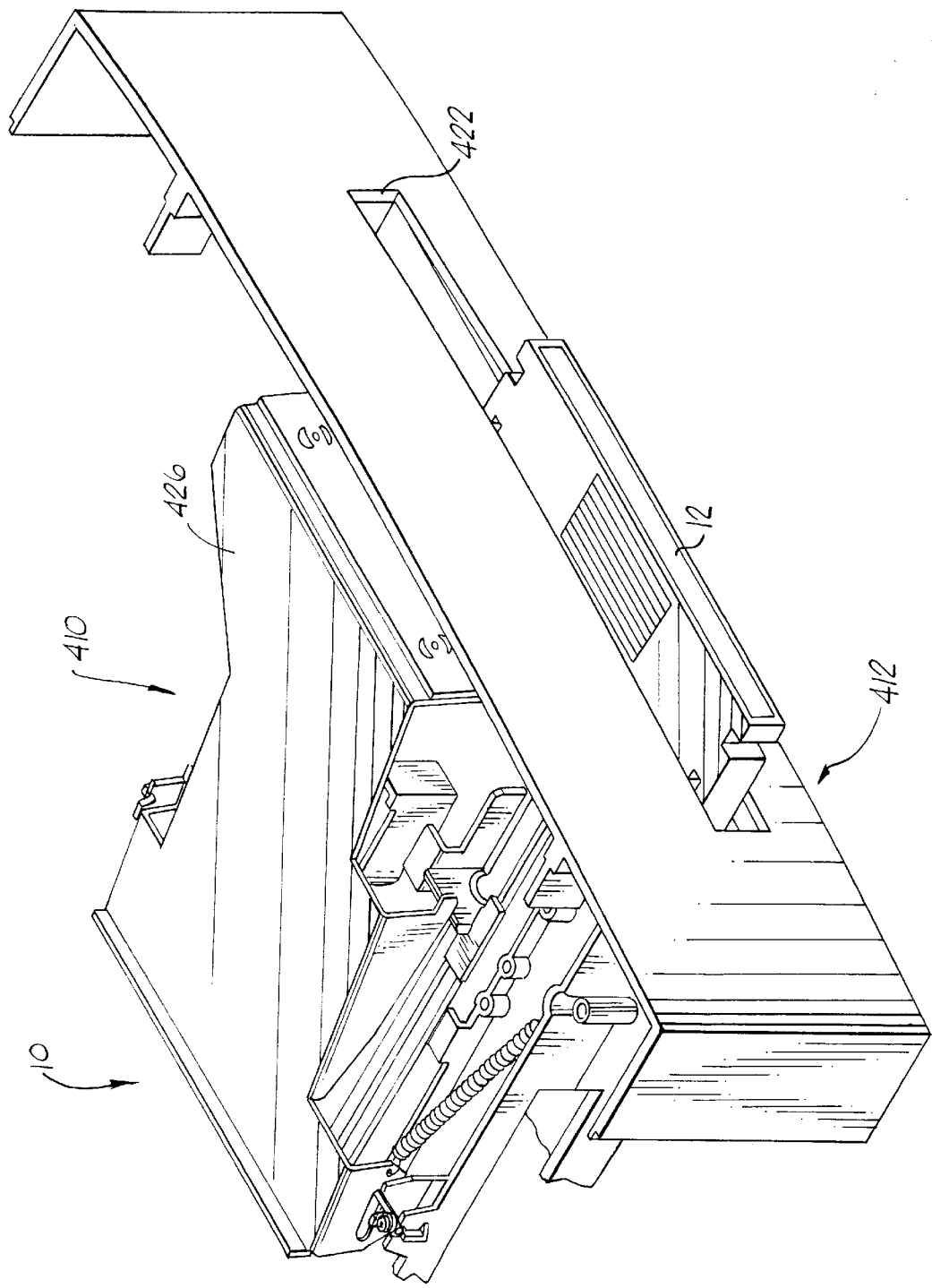
FIG. 13 is a front perspective view of a portion of the door assembly of FIG. 12 with the door assembly in an open position.

FIGS. 12–21 illustrate an automatic door assembly for an optical disk insertion apparatus. It is desirable to provide such a door in order to offer visual feedback to the operator regarding whether the apparatus is ready to receive a new disk cartridge or not. If the door is open, as shown in FIG. 13, the operator knows that the insertion device is in its first operating position awaiting insertion or removal of a disk. If, on the other hand, the door is closed, as shown in FIG. 12, the operator knows that a disk cannot be inserted because the insertion device is not in its first operating position.

Aside from the advantage of visual feedback described above, a door also prevents contaminants such as dust from entering the insertion apparatus 10 and the optical disk storage and handling system 11.

FIG. 12 shows a door assembly 410 which includes a front panel 412 which is adapted to be mounted on the outer surface of an optical disk storage and handling system 11, FIG. 3, when the insertion device is mounted in the system. Front panel 412 may include a front surface 414, a rear surface 416, FIG. 17, and two rearwardly extending side portions 418 and 420, FIG. 12. When assembled into an optical disk storage and handling system, the front surface 414 of the front panel 412 forms part of the outer surface of the system which is visible to users of the system, i.e., it forms a portion of the system housing.

Front surface 414 may have a slightly convex configuration for aesthetic purposes and has an opening 422 therein through which the optical disk cartridges 12 pass as shown in FIG. 13. Opening 422 is closed by door member 424 when the door assembly is in its closed position as shown in FIG. 12. Door member 424 is a generally parallelepiped-shaped structure having a front surface 428, FIG. 14, a rear surface 430, FIG. 17, a top surface 432, FIG. 14, a bottom surface 434, FIG. 18, a first side surface 436, FIG. 14 and a second side surface 438, FIG. 16.

Figure 18:
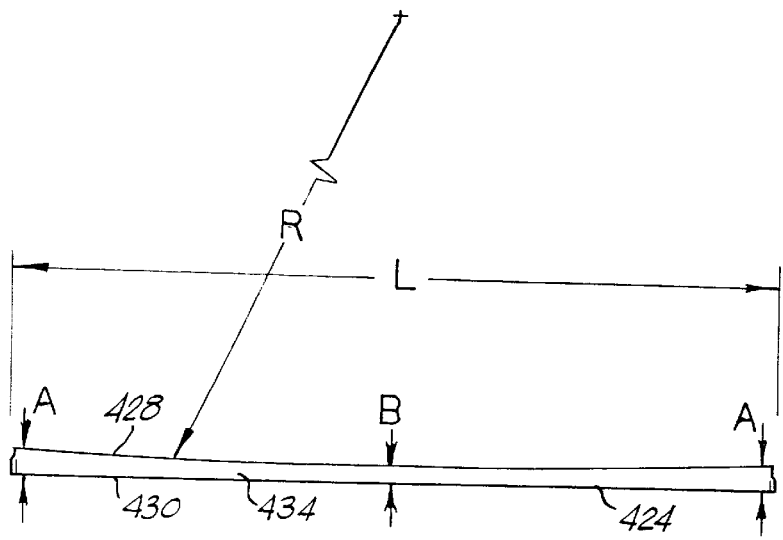
FIG. 18 is a bottom plan view of a door member of the door assembly of FIG. 12.

FIG. 18 shows the door 424 from the bottom thereof. As can be seen, front surface 428 may be a curved surface having a radius R of about 4401 mm. Due to this curved surface, the door member thickness may vary from a thickness B of about 5.3 mm at its center to a thickness A of about 6.76 mm at each end. The curved front surface 428 aids in proper door closure as explained in more detail hereafter.

Figure 17:
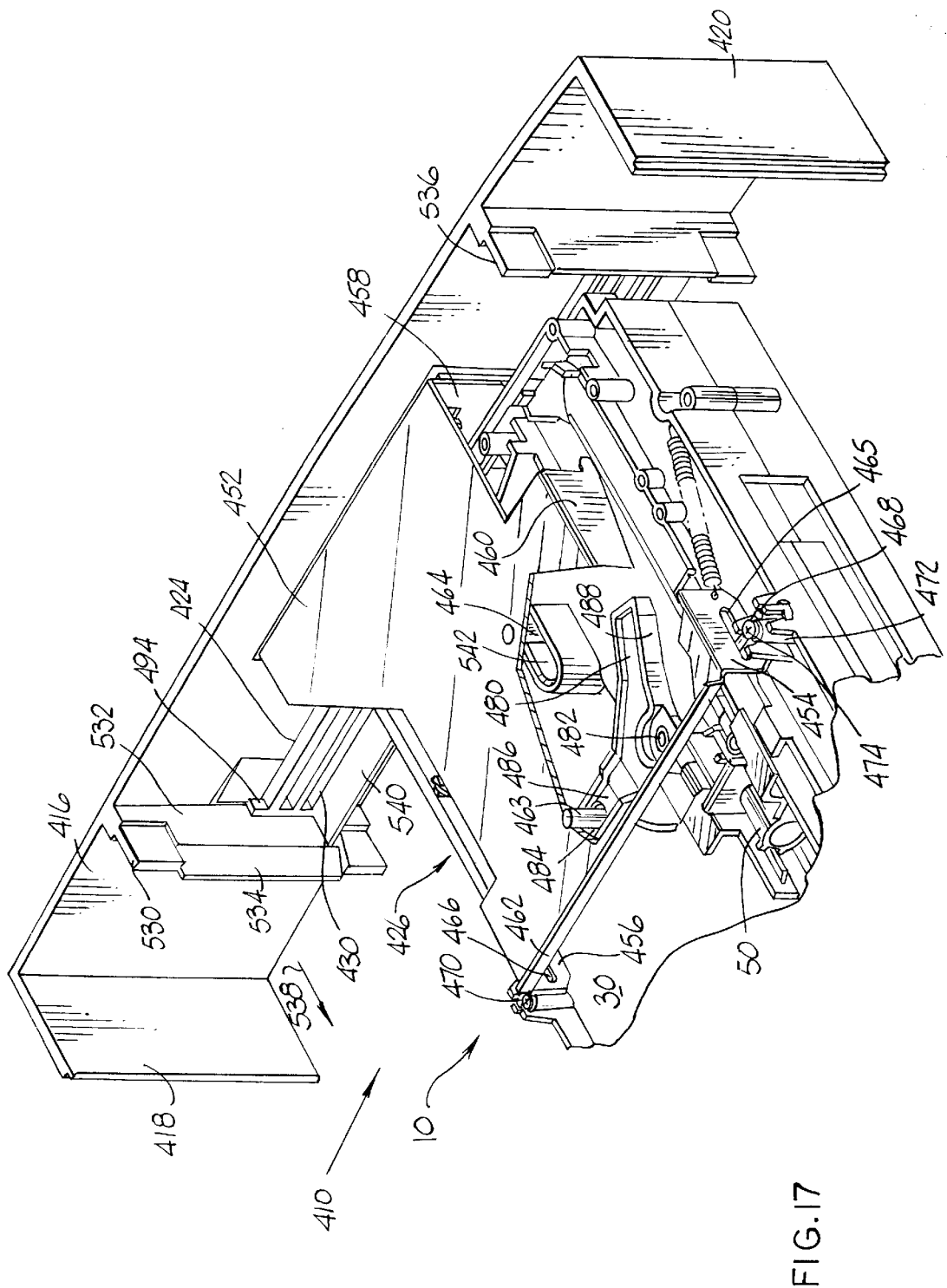
FIG. 17 is a rear perspective view of an optical disk insertion apparatus having a door assembly in a closed position.
Figure 19:
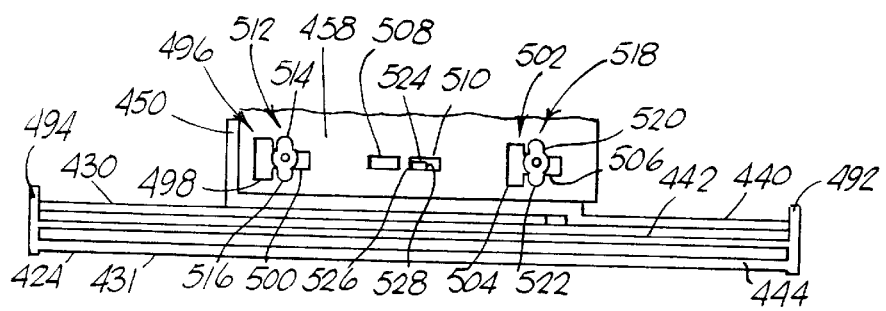
FIG. 19 is a rear elevation detail view illustrating the connection between portions of the door assembly of FIG. 12.
Figure 20:
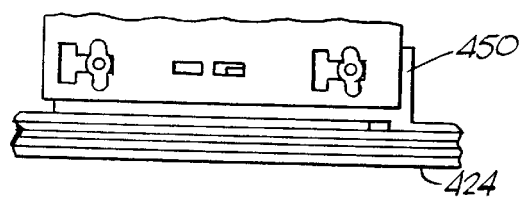
FIG. 20 is a rear elevation detail view of the connection of FIG. 19 in a different configuration.

The rear surface 430 of door 424 comprises a series of ribs 440, 442, 444, FIGS. 17, 19, which may be integrally formed with the front surface 428. These ribs provide strength and structural rigidity to the door 424. Stop members 492 and 494 may be integrally formed with the ribs 440, 442, 444 and the front surface 428 as shown in FIG. 19. Stop members 492 and 494 aid in proper door closure as explained in more detail hereafter.

Figure 14:
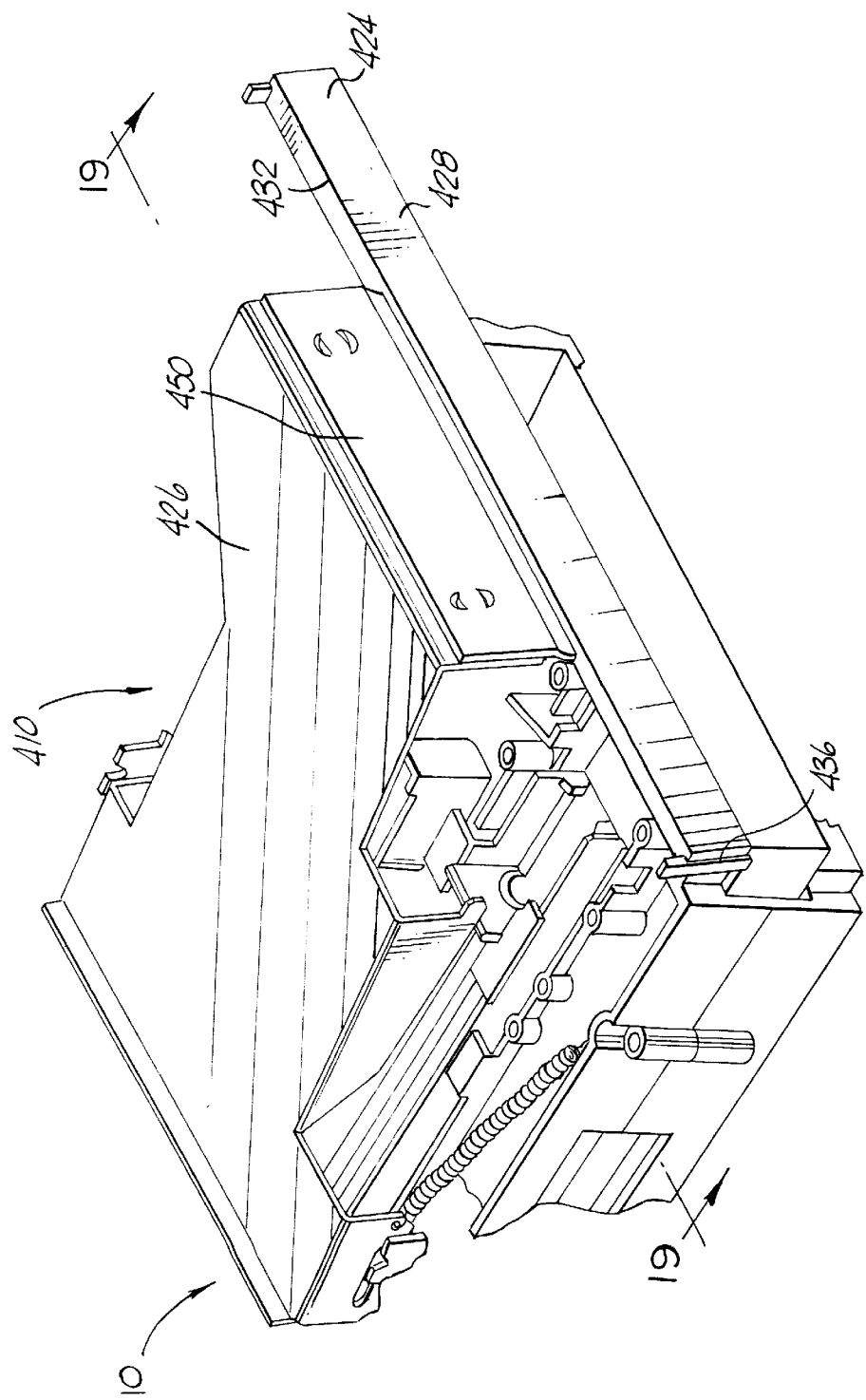
FIG. 14 is a front perspective view of a portion of the door assembly of FIG. 13.

Door 424 also includes a connection tab 450, FIG. 14, which is used to connect the door 424 to a door support 426. Door support 426 is a generally rectangularly shaped member having a flat top portion 452, FIG. 17, downwardly extending angled portions 454, 456, and a downwardly extending connector portion 458. Support 426 also includes a downwardly extending cam member 460 and may include an upwardly angled portion 462 which adds strength to the door support structure 426. Downwardly extending studs 463 and 464 may be press-fit into the support top portion 426. Door support 426 may be constructed of metal or another rigid material and have a thickness of, e.g., 1 mm.

Referring again to FIG. 17, angled portions 454 and 456 contain slots 465 and 466, respectively. Pins 468 and 470 extend through the slots 465 and 466 and serve to attach the support structure 426 to the housing 30 of the insertion apparatus 10. This pin and slot combination allows the support 426 to both slide and rotate with respect to the housing 30. Pin 468 may be attached to the housing in any conventional manner. An example of one method of attachment is shown in FIG. 17 and comprises a support block 472 which may be integrally formed with the housing 30. A screw or other suitable attachment mechanism 474 may be used to secure the pin 468 to the support block 472. The pin 470 may be secured to the housing 30 in a similar manner.

Figure 16:
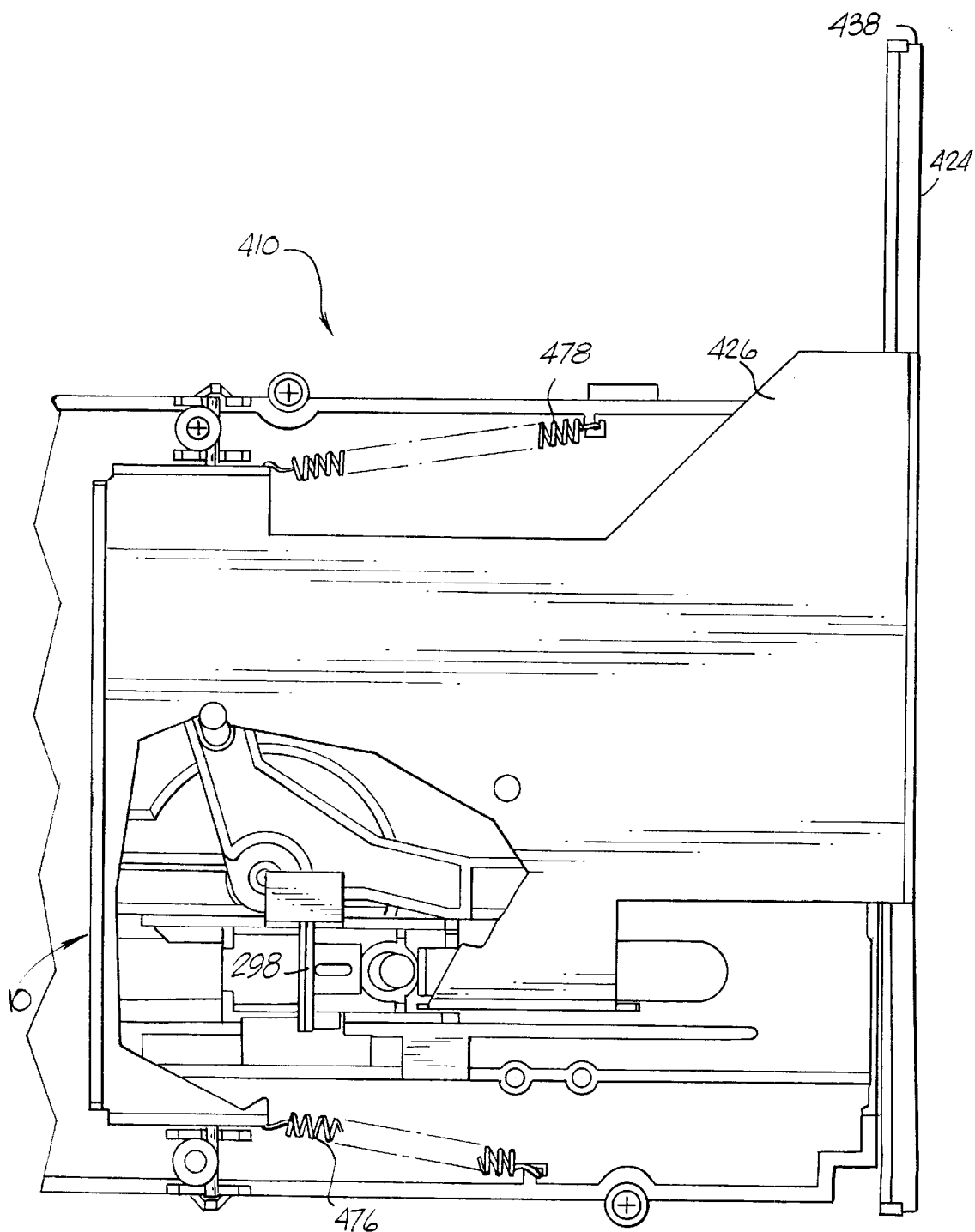
FIG. 16 is a top plan view of an optical disk insertion apparatus having a door assembly.

Springs 476 and 478, FIG. 16, are attached to both the housing 30 and the angled portions 454 and 456 of the door support 426. These springs bias the door support, and thus the door 424 into the fully forward, lowered, closed position shown in FIGS. 12 and 17. In this position, the pins 468 and 470 are located near the rear of the slots 465 and 466.

Referring to FIG. 17, a pivot member 480 is mounted on the housing 30 for pivotal movement about a pivot 482. One end 486 of pivot member 480 is provided with a hole 484 through which the door actuator stud 463 passes. The other end of the pivot member 480 is provided with a cam face 488 which extends into the path of the insertion apparatus actuator 50. As can be seen, the pivot member 480 is mounted for rotation in a horizontal plane about an axis which is perpendicular to the plane of travel of the insertion apparatus actuator 50.

Door actuator cam member 460 has an angled face which also extends into the path of the insertion apparatus actuator 50. Door support 426 is preferably formed of a single piece of metal which is formed into the configuration shown. This configuration of the door support allows the cam 460 to be cut or stamped rather than bent. This is advantageous since bending the door support 426 to establish the cam surface could reduce dimensional precision and consequently the ability to accurately reference across the door support.

In operation, as the insertion device actuator 50 and the attached cartridge carrier 40 move toward the front of the housing 30, the sidewall 258 of the actuator 50 will come into contact with the cam face 488 of the pivot member 480. Further forward movement of the actuator 50 will cause the pivot member 480 to rotate counter-clockwise about the pivot 482, thus moving the end 486 of the pivot member and the door support stud 463 in a rearward direction. This results in rearward movement, or retraction, of the door support 426 and the attached door 424 to the position shown in FIG. 16. During this rearward movement, the door support slots 265, 266 slide along the pins 468 and 470 to the position shown in FIG. 16 and the door support stud 464 slides within the groove 542 located in the top surface of the housing 30, FIG. 17, to assist in guiding the door support.

Because the pivot member 480 rotates in a horizontal plane that is parallel to the translational plane of actuator 50, very little vertical space is needed for the retract mechanism. This is an important advantage because vertical space is typically quite limited in most optical disk storage and handling devices.

Figure 15:
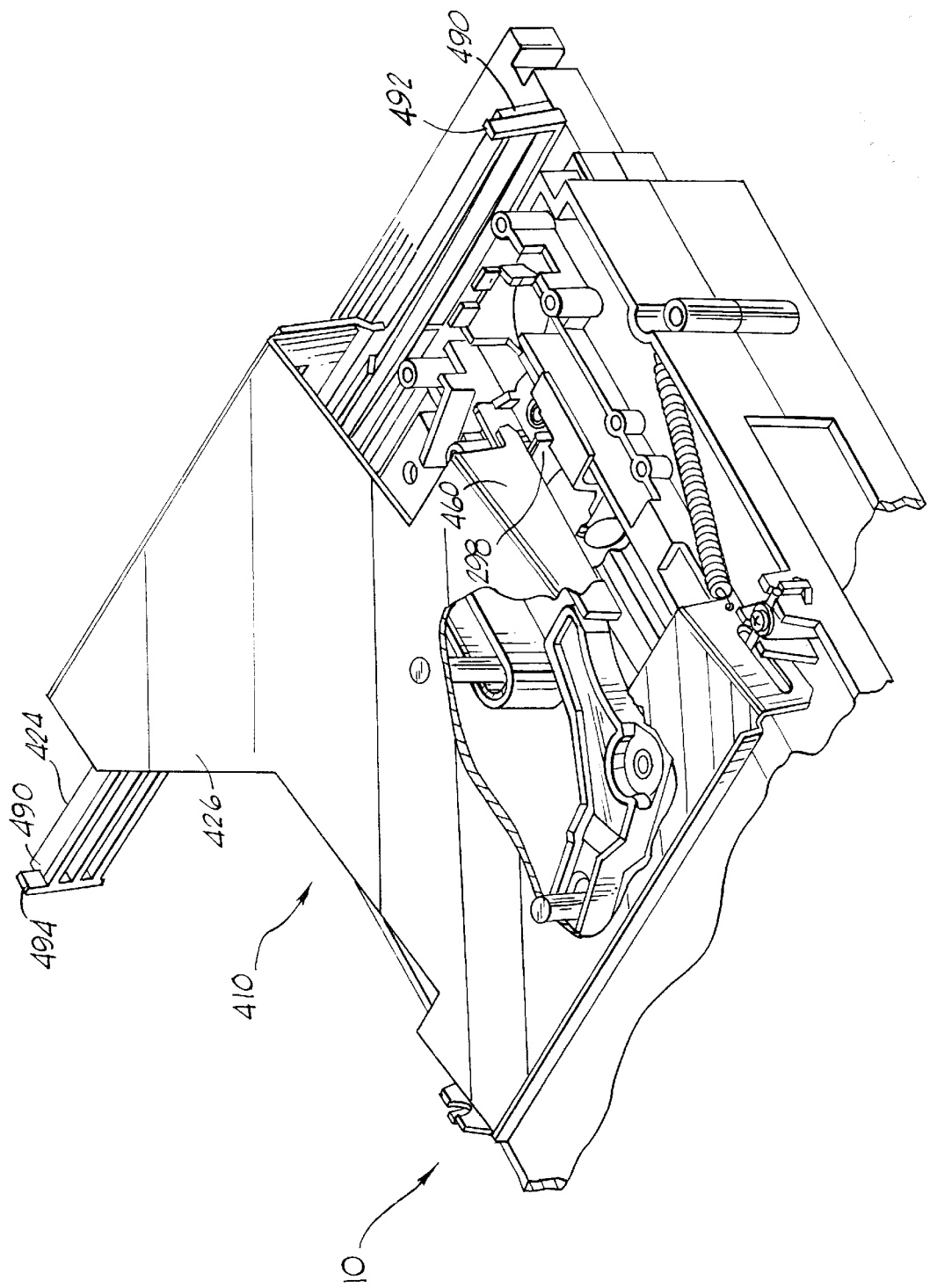
FIG. 15 is a rear perspective view of an optical disk insertion apparatus having a door assembly in an open position.

Further forward movement of the actuator 50 results in contact between the transverse member 298 of actuator 50 and the cam member 460 of the door support 426, FIG. 15. This contact causes the door support 426 to begin pivoting about the pins 468 and 470 thus causing the front of the door support 426 along with the attached door 424 to begin lifting. This lifting continues until the actuator reaches its forwardmost point of travel as shown in FIG. 15.

The mechanism described above, thus, causes the door 424 to first retract from the panel 412 and then to lift out of the path of the cartridge carrier 40. This retract step is important because, when closed, portions of the door 424 actually enter the panel opening 422 as described in more detail below. Accordingly, it is necessary to retract the door from the opening before it can be lifted. In other words, the door must be retracted at least a sufficient distance to clear the opening 422 before it can be lifted out of the path of the cartridge carrier 40. The total retract distance for the door 424 will be dependent upon the specific geometry and location of the pivot member 480. In one example, the total retract distance for the door may be about 12 mm and the total lift height for the door may be about 27 mm.

Upon reversal of the actuator 50, the process described above is reversed with the door first being lowered and then advanced into contact with the rear surface 416 of the front panel 412. The resulting closed configuration is shown in FIG. 17 in which the actuator 50 has retracted out of contact with the pivot member 480. The force to lower and advance the door is supplied by the springs 476 and 478.

It is important to note that, in the door opening operation, the retract and lift operations are sequential. In other words, the retract motion is completely finished before the lift motion begins. This allows the actuator 50 to supply force for each operation at different times and results in a lower maximum force supplied by the actuator 50 to open the door. Consequently, less force is required to be supplied by the wire rope 272 and the motor 274.

Also, because the door assembly 410 is normally biased to its closed position by springs 476 and 478, it is able to readily recover from an error condition. Such an error condition might occur, for example, if an operator were to push the closed door back and up. Even if the door were to bind in this position, it would be reset upon the next forward trip of the actuator 50.

In order to provide an aesthetically pleasing appearance, door 424 may be configured to actually fit within the opening 422. As the door 424 is advanced towards its closed configuration, the outer portions 490 of the door 424, FIG. 15, move into the door opening 422. This movement is halted by contact of the stops 492 and 494 with the rear surface 416 of the panel 412 as shown in FIG. 17. Because the door 424 has a curved surface, stops 492, 494 will contact the rear surface 416 before the door connection tab 450. Continued forward movement of the door and door support after contact by the stops 492 and 494 results in a slight deformation of door member 424 thus ensuring a close fit within the opening 422. Forward movement is halted when the connection tab 450 contacts the rear surface of the panel 412.

The door assembly 410 may also be provided with a self alignment feature as will now be explained in detail. FIG. 19 is a view of the door 424 to door support 426 attachment taken along the line 19—19 in FIG. 14. Door support connector portion 458 is provided with a first T-shaped slot 496. The T-shaped slot has a vertical portion 498 forming the "top" of the T-shape and a horizontal portion 500 forming the "upright" of the T-shape. A second T-shaped slot 502 is also provided in the connector portion 458 as shown. Second T-shaped slot 502 has a vertical portion 504 and a horizontal portion 506 and may be identical to the first T-shaped slot 496. Two rectangular slots 508, 510 are also provided in the connector portion 458 as shown.

Figure 21:
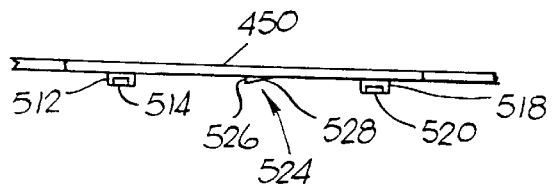
FIG. 21 is a top plan view of a portion of the door assembly of FIG. 12.

A first catch member 512 may be integrally formed with the connection tab 450. Catch 512 is provided with ears 514 and 516 which are offset (as best shown in FIG. 21) from the surface of connection tab 450 by a distance approximately equal to the thickness of the connector portion 458. A second catch member 518 may also be provided as shown. Second catch member 518 has ears 520, 522 and may be identical to the first catch member 512.

FIG. 21 is a top view of the door connection tab 450. As shown in FIG. 21, a raised stop member 524 may also be integrally formed with the connection tab 450. Stop member 524 is provided with a ramped end 528 and a non-ramped end 526.

To attach the door connection tab 450 to the door support connection portion 458, catch members 512, 518 are first inserted into the vertical portions 498, 504 of the T-shaped slots 496 and 502. At this point, the stop member 524 will be located in the first rectangular slot 508. The connection tab 450 is then slid to the right, as viewed in FIG. 19, causing the catch portions 512, 518 to enter the horizontal portions 500, 506 of the T-shaped slots 496 and 502. As this movement occurs, the stop member 524 will enter the second rectangular slot 510. The ramped portion 528 of stop member 524 facilitates this movement.

At this point, the ears of the catch members 512, 518 prevent removal of the connection tab 450 from the connector portion 458 and thus the door 424 is securely fastened to the door support 426. The attachment described above, however, allows horizontal movement of the door 424 between the positions shown in FIGS. 19 and 20. In the FIG. 19 position, further movement to the left is prevented by contact between the non-ramped portion 526 of the stop member 524 with the left edge of the second rectangular slot 510. In the FIG. 20 position, further movement to the right is prevented by contact between the catch members 512, 518 with the right edges of the horizontal portions 500, 506. Accordingly, the door 424 is able to move horizontally between the positions shown in FIGS. 19 and 20. This distance may be, e.g., approximately 5.4 mm.

This freedom of movement facilitates assembly of the insertion apparatus 10 and the front panel 412 into the optical disk storage and handling system 11. For proper operation, the insertion apparatus 10 must be closely aligned with the system 11 and particularly with the handling device 18 of the system. This makes it difficult to also closely align the insertion apparatus 10 with the front panel 412. The movable door mounting system described above allows the door 424 to self-align with the front panel 412 as will now be described in further detail.

Referring to FIG. 17, the rear surface 416 of the panel 412 is provided with a first wall portion 530. This wall portion contains a flat surface 532 and a ramped surface 534. A second wall portion 536 is also provided on the rear surface 416 of panel 412 and may be identical to the first wall portion 530, except in an oppositely oriented configuration.

To attach the panel 412 to the system, it is initially moved in the direction of arrow 538 in FIG. 17. This movement causes the ramped surfaces of the wall portions 530, 536 to guide the horizontally movable door 424 into alignment with the flat surfaces of the wall portions 530 and 536. Once the panel 412 is attached to the system, the flat surfaces constrain the door 424 from horizontal movement and force it into alignment with the opening 422 in the panel 412. In this manner, the door 424 and panel 412 are self-aligning in a horizontal direction.

The door 424 and the panel 412 are also self-aligning in a vertical direction. Referring again to FIG. 17, a shelf 540 is provided on the rear surface of panel 412. This shelf limits the downward travel of the door 424 and forces it into vertical alignment with the opening 422.

In the above description, terms such as "horizontal" and "vertical" are used for illustration purposes only. In actual use, the insertion device 10 can be mounted in almost any position, thus making terms such as "horizontal" and "vertical" relative to the orientation of the insertion device.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art. For example, although an optical disk cartridge insertion apparatus door assembly has been specifically described, it is to be understood that the invention applies to any media cartridge handling apparatus including magnetic disks (floppy and hard), tape cartridges and other data storage cartridges having a configuration which necessitates mechanized handling of the cartridge.

What is claimed is:

1. A door assembly for a cartridge receiving device having an exteriorly located panel which includes an access opening therein adapted to receive cartridges therethrough comprising:
   (a) a door opening and closing mechanism operatively associated with said cartridge receiving device;
   (b) a door panel adapted to selectivly close said access opening;
   (c) said door panel being slidingly attached to said door opening and a closing mechanism;
   (d) said door panel being linearly movable with respect to said access opening and with respect to said door opening and closing mechanism:
      wherein, said door opening and closing mechanism is movable between at least a first position and a second position; and
      wherein:
         in said first position said access opening is at least partially blocked by said door panel; and
         in said second position said access opening is not blocked by said door panel.

2. The apparatus of claim 1 wherein said door opening and closing mechanism comprises a door retract mechanism.

3. The apparatus of claim 1 wherein said door opening and closing mechanism includes both a door retract and a door lift mechanism.

4. A door assembly for a cartridge receiving device having an access opening and an actuator which causes movement of a cartridge received through said access opening comprising:
   (a) a door opening mechanism;
   (b) a door panel adapted to close said access opening;
   (c) said door panel being attached to said door opening mechanism;
   (d) a pivot member having a first portion and a second portion;
   (e) said pivot member first portion operatively connected to said door opening mechanism;
   (f) wherein said actuator has a movement path within said cartridge receiving device and said pivot member second portion is located within said actuator movement path.

5. The apparatus of claim 4 wherein said door opening mechanism comprises a door retract mechanism.

6. The apparatus of claim 4 wherein said actuator movement path is constrained to a single actuator plane of movement and said pivot member pivots about a pivot member axis that is transverse to said actuator plane of movement.

7. The apparatus of claim 6 wherein said pivot member axis is substantially perpendicular to said actuator plane of movement.

8. The apparatus of claim 4 wherein said door opening mechanism includes both a door retract and a door lift mechanism.

9. A method of opening the access door of a cartridge receiving device of the type having an exteriorly located panel which includes an access opening therein adapted to receive said cartridges therethrough comprising:
   (a) retracting said access door away from said access opening by moving said access door in a substantially linear fashion in a first direction;
   (b) lifting said access door by pivoting said access door relative to a pivot point; and
   (c) moving one of said cartridges through said opening in said first direction.

10. The method of claim 9 wherein said retracting occurs before said lifting.

11. The method of claim 9 wherein said access door is moved closer to said pivot point during said retracting said door.

12. The method of claim 9 and further including:
   (a) providing a door opening mechanism attached to said access door, said door opening mechanism including at least one elongated slot therein;
   (b) wherein said pivot point comprises at least one pivot pin attached to said cartridge receiving device and said at least one pivot pin extends through said at least one elongated slot and;
   (c) wherein said retracting said access door comprises sliding said door opening mechanism relative to said at least one pivot pin.

13. The method of claim 12 wherein said lifting said access door comprises pivoting said door opening mechanism relative to said at least one pivot pin.

14. A method of closing an access opening of a cartridge handling device in which cartridges are moved in a plane of movement comprising:
- (a) providing a door member adapted to close said access opening;
- (b) causing a first movement of said door member by pivoting said door member about a pivot point; and
- (c) causing a second movement of said door member toward said access opening in a direction substantially parallel to said plane of movement by moving said door member away from said pivot point.

15. The method of claim 14 wherein said causing a first movement precedes said causing a second movement.

16. The method of claim 14 and further including:
- (a) contacting at least a peripheral portion of said access opening with said door member;
- (b) applying a force to said peripheral portion with said door member.

17. The method of claim 16 wherein said application of force causes deformation of said door member.

18. The method of claim 14 and further including:
- (a) providing a door mechanism attached to said door member, said door mechanism including at least one elongated slot therein;
- (b) providing at least one pivot pin attached to said cartridge handling device, said pivot pin extending through said at least one elongated slot; and
- (c) wherein said causing a first movement of said door member comprises pivoting said door mechanism about said at least one pivot pin.

19. The method of claim 18 wherein said causing a second movement of said door member comprises slidingly moving said door mechanism relative to said at least one pivot pin.

* * * * *

UNITED STATES PATENT AND TRADEMARK OFFICE
CERTIFICATE OF CORRECTION

PATENT NO.    : 6,233,215 B1
DATED         : May 15, 2001
INVENTOR(S)   : D. Scott Paul et al.

It is certified that error appears in the above-identified patent and that said Letters Patent is hereby corrected as shown below:

Column 13,
Line 58, after "and" delete "a"

Signed and Sealed this

Fourteenth Day of January, 2003

JAMES E. ROGAN
*Director of the United States Patent and Trademark Office*